(No Model.)
B. H. PASSMORE.
MEAT TENDERER.
No. 504,892.        Patented Sept. 12, 1893.
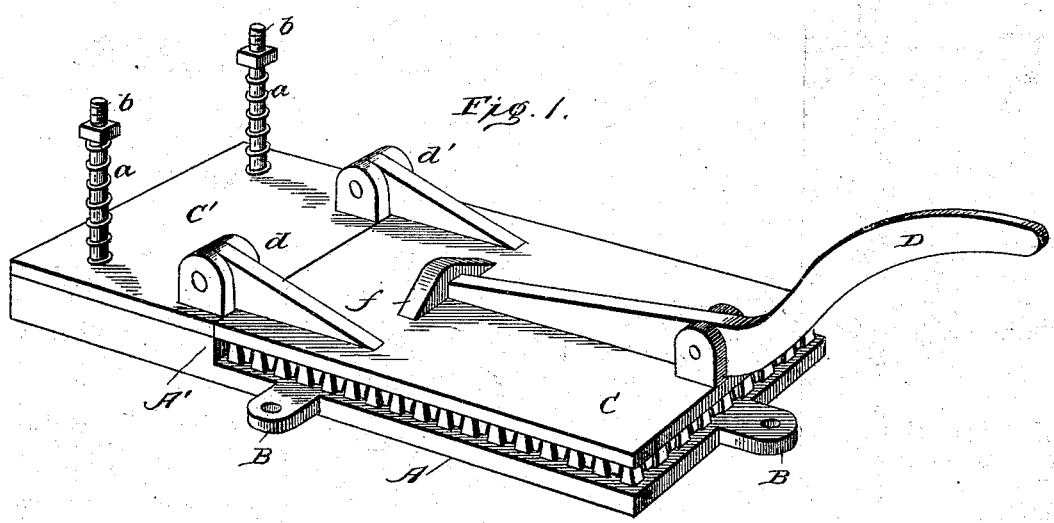
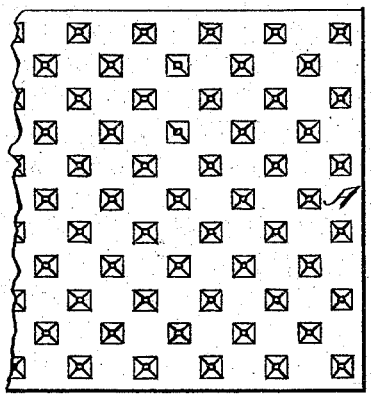
Witnesses
Edwin L. Bradford
Frank H. Thatcher
Inventor
Benjamin Hill Passmore
By Patrick O'Farrell
Attorney

UNITED STATES PATENT OFFICE.

BENJAMIN HILL PASSMORE, OF BELMONT, TEXAS.

MEAT-TENDERER.

SPECIFICATION forming part of Letters Patent No. 504,892, dated September 12, 1893.

Application filed April 19, 1893. Serial No. 471,034. (No model.)

*To all whom it may concern:*

Be it known that I, BENJAMIN HILL PASSMORE, a citizen of the United States of America, residing at Belmont, in the county of Gonzales and State of Texas, have invented certain new and useful Improvements in Meat-Tenderers, of which the following is a specification, reference being had therein to the accompanying drawings.

My invention relates to meat-tenderers, and it consists of two plates having a series of intermeshing teeth thereon and connected by suitable means to allow of automatic adjustment, the object of which is to provide a utensil for culinary purposes.

In the accompanying drawings, Figure 1, is a perspective view of my improved meat-tenderer. Fig. 2, is a fragmentary view of the toothed surface of one of the plates. Fig. 3, is a cross section of the two plates, showing the intermeshing teeth.

Referring to the several parts by letters of reference: A is the base or lower plate of the device; B lugs whereby the device may be fastened and held to a table or any suitable support. C is the upper or mashing plate of the device attached to a plate C' by means of suitable hinges $d\ d$.

D is the hand lever for operating the device. The plate C' is secured to the raised portion A' of the base plate A, by means of posts $b\ b$, the ends of which are threaded and fitted with nuts, between which and the plate C' are placed the springs $a\ a$; this construction enables the rear portion of the plate C, to accommodate itself to meat of different thicknesses without stopping to adjust the mechanism.

Having thus described my invention, what I claim as new, and desire to secure by Letters Patent, is—

The combination of a meat-tenderer, of a base plate A, having a raised portion A', with the plates C C', articulated at $d\ d$ and connected by rods $b\ b$, to the base, said rods provided with springs $a\ a$, substantially as and for the purpose specified.

In testimony whereof I affix my signature in presence of two witnesses.

BENJAMIN HILL PASSMORE.

Witnesses:
CHARLIE S. RATHER,
J. G. BOULDIN.